(12) United States Patent
Lu et al.

(10) Patent No.: US 11,579,946 B2
(45) Date of Patent: *Feb. 14, 2023

(54) METHOD FOR MANAGING MULTIPLE OPERATING SYSTEMS IN A TERMINAL

(71) Applicant: HUAWEI TECHNOLOGIES CO., LTD., Guangdong (CN)

(72) Inventors: Bo Lu, Hangzhou (CN); Jianfei Zhong, Hangzhou (CN); Yunjian Ying, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/221,505

(22) Filed: Apr. 2, 2021

(65) Prior Publication Data

US 2021/0232447 A1 Jul. 29, 2021

Related U.S. Application Data

(63) Continuation of application No. 16/454,945, filed on Jun. 27, 2019, now Pat. No. 11,023,296, which is a (Continued)

(30) Foreign Application Priority Data

Dec. 29, 2016 (CN) .......................... 201611249461.8

(51) Int. Cl.
*G06F 9/54* (2006.01)
*G06F 16/33* (2019.01)
*G06F 9/48* (2006.01)

(52) U.S. Cl.
CPC ............ *G06F 9/542* (2013.01); *G06F 9/4843* (2013.01); *G06F 9/546* (2013.01); *G06F 16/334* (2019.01); *G06F 2209/522* (2013.01)

(58) Field of Classification Search
None
See application file for complete search history.

(56) References Cited

U.S. PATENT DOCUMENTS

2006/0005187 A1 1/2006 Neil
2011/0126216 A1 5/2011 Galicia et al.
(Continued)

FOREIGN PATENT DOCUMENTS

CN 101894042 A 11/2010
CN 102681887 A 9/2012
(Continued)

*Primary Examiner* — Syed A Roni
(74) *Attorney, Agent, or Firm* — Womble Bond Dickinson (US) LLP

(57) ABSTRACT

The disclosure provides a method for managing multiple operating systems in a terminal. The terminal includes multiple operating systems and a management system. The management system is configured to manage the multiple operating systems. The management system includes a cross-system application database. The method includes: when a first operating system in the multiple operating systems runs in a foreground, and a second operating system in the multiple operating systems runs in a background, if the second operating system receives a first message of a first application in the second operating system, sending, by the second operating system, a notification message to the management system; storing, by the management system, the notification message into the cross-system application database; and listening, by the first operating system, on the cross-system application database, and outputting a prompt of the first message when listening and obtaining the notification message.

15 Claims, 12 Drawing Sheets

Related U.S. Application Data continuation of application No. PCT/CN2017/100550, filed on Sep. 5, 2017.

(56)   References Cited

U.S. PATENT DOCUMENTS

| | | |
|---|---|---|
| 2015/0143362 A1 | 5/2015 | Lukacs et al. |
| 2015/0193241 A1 | 7/2015 | Hamzata |
| 2015/0254086 A1 | 9/2015 | Nakajima |
| 2015/0350005 A1 | 12/2015 | Singh et al. |
| 2016/0371124 A1 | 12/2016 | Kim et al. |
| 2017/0277561 A1 | 9/2017 | Zhong et al. |

FOREIGN PATENT DOCUMENTS

| | | |
|---|---|---|
| CN | 104516760 A | 4/2015 |
| CN | 104796529 A | 7/2015 |
| CN | 105183495 A | 12/2015 |
| CN | 105260664 A | 1/2016 |
| CN | 105511970 A | 4/2016 |
| CN | 105577906 A | 5/2016 |
| CN | 105630615 A | 6/2016 |
| CN | 106020829 A | 10/2016 |
| EP | 3062225 A1 | 8/2016 |
| WO | 2016161682 A1 | 10/2016 |
| WO | 2016183872 A1 | 11/2016 |

200

When a first operating system in multiple operating systems runs in a foreground, and a second operating system in the multiple operating systems runs in a background, if the second operating system receives a first message of a first application in the second operating system, the second operating system sends a notification message to a management system according to the first message, where the notification message carries at least one of operating system information corresponding to the first message, application information corresponding to the first message, or quantity information corresponding to the first message ~ S210

The management system stores the notification message into a cross-system application database ~ S220

The first operating system listens on the cross-system application database, and outputs a prompt of the first message when listening and obtaining the notification message ~ S230

FIG. 2

METHOD FOR MANAGING MULTIPLE OPERATING SYSTEMS IN A TERMINAL

CROSS-REFERENCE TO RELATED APPLICATIONS

This application is a continuation of U.S. patent application Ser. No. 16/454,945, filed on Jun. 27, 2019, now issued as Patent No. U.S. Pat. No. 11,023,296 B2, which is a continuation of International Application No. PCT/CN2017/100550, filed on Sep. 5, 2017, which claims priority to Chinese Patent Application No. 201611249461.8, filed on Dec. 29, 2016. All of the afore-mentioned patent applications are hereby incorporated by reference in their entireties.

TECHNICAL FIELD

Embodiments of the present disclosure relate to the terminal field, and more specifically, to a method for managing multiple operating systems in a terminal in the terminal field.

BACKGROUND

In recent years, a terminal device has more powerful functions and supports more functions. Multiple systems can simultaneously run on one terminal. Only one system occupies a foreground, and the other systems run in a background. The multiple systems are separated from each other by using a container technology, and may be dynamically switched in real time. However, although separation between the systems brings better security, the separation also brings some inconvenience. For example, when a system processes an email, another system receives an instant message. In this case, it is relatively inconvenient if the terminal switches to the another system to process the message and then switches to the original system.

Currently, a cross-system application security protection solution is provided in the prior art. In this solution, a shared area is created based on multiple systems and used for running a shared application in the systems. However, in this solution, whether an application in the shared area has received an instant message still cannot be perceived, and a user needs to actively switch to a corresponding system to check whether there is an instant message. Consequently, user experience is poor.

SUMMARY

Embodiments of the present disclosure provide a method for prompting a message in a terminal and a terminal, so that a user can perceive, in a foreground operating system, an instant message in a background operating system, and user experience is good.

According to a first aspect, a method for prompting a message in a terminal is provided, where the terminal includes multiple operating systems and a management system, the management system is configured to manage the multiple operating systems, the management system includes a cross-system application database, and the method includes:

when a first operating system in the multiple operating systems runs in a foreground, and a second operating system in the multiple operating systems runs in a background, if the second operating system receives a first message of a first application in the second operating system, sending, by the second operating system, a notification message to the management system according to the first message, where the notification message carries at least one of operating system information corresponding to the first message, application information corresponding to the first message, or quantity information corresponding to the first message;

storing, by the management system, the notification message into the cross-system application database; and listening, by the first operating system, on the cross-system application database, and outputting a prompt of the first message when listening and obtaining the notification message.

In this embodiment of the present disclosure, when an operating system (such as the first operating system) in the multiple operating systems runs in the foreground, and an operating system (such as the second operating system) in the multiple operating systems runs in the background, if an application (such as the first application) in the second operating system receives an instant (or real-time) message (such as the first message), the second operating system may send a message (such as the notification message) to the management system according to the first message. Then, the management system may store the notification message into the cross-system application database. In addition, when the first operating system is started, the first operating system listens on the cross-system application database. When listening and obtaining the notification message, the first operating system outputs the prompt or a reminder of the first message. In this way, a user can directly perceive, in a foreground operating system, an instant message in another background operating system without actively switching from the foreground operating system to the background operating system, so that user experience is improved.

In this embodiment of the present disclosure, the cross-system application database included in the management system may be accessed by the multiple operating systems.

Optionally, in this embodiment of the present disclosure, the management system may be a host (Host) OS, which may be a system with management permission, and be configured to manage all operating systems. For example, the management system may control an operating system to switch from running in the foreground to running in the background, or control an operating system to switch from running in the background to running in the foreground.

In some implementations, the cross-system application database may include at least one of an application name, an operating system in which an application is located, an application icon, a message quantity of an application, or an operating system for monitoring a message quantity of an application.

Optionally, there may be a global application information database table in the cross-system application database. The database table may include five key information fields, including: 1. an application name (APP Name); 2. a target system (Install OS) in which an application is installed; 3. a list of a system (Monitor OS) for concerning or monitoring a change in an instant message of the application; 4. an application icon (Icon); and 5. an instant-message quantity (Message Number, Msg Num). Optionally, other fields may be further included for subsequent extension.

Optionally, in this embodiment of the present disclosure, the "outputting a prompt of the first message" may be outputting or displaying, in the foreground operating system, a quantity of prompts of the first message.

In some implementations, the method may further include:

obtaining, by the first operating system, an input instruction of a user, and sending a switch request message to the management system according to the input instruction of the user and the first message;

switching, by the management system according to the switch request message, the first operating system from running in the foreground to running in the background, and switching the second operating system from running in the background to running in the foreground; and sending the notification message to the second operating system; and starting, by the second operating system, the first application according to the notification message.

Optionally, after discovering the prompt of the first message, the user may tap a shortcut of the first application corresponding to the first message. From a perspective of the first operating system that runs in the foreground of the terminal, the first operating system may obtain the input instruction of the user (which may be a tap event of the user, for example).

In this way, the terminal may directly switch to a corresponding operating system according to the shortcut of the first application, so as to greatly facilitate an operation of the user.

According to a second aspect, a terminal is provided, where the terminal may include multiple operating systems and a management system, and the management system includes a cross-system application database, where a first operating system in the multiple operating systems is configured to: receive a first message of a first application in the first operating system, and send a notification message to the management system according to the first message, where the notification message includes the first message, and the notification message carries at least one of operating system information corresponding to the first message, application information corresponding to the first message, or quantity information corresponding to the first message;

the management system is configured to store the notification message into the cross-system application database; and a second operating system in the multiple operating systems is configured to: listen on the cross-system application database, and output a prompt of the first message when listening and obtaining the notification message, where the second operating system runs in a foreground.

According to the terminal in this embodiment of the present disclosure, the operating system that runs in a background may send a received instant message to the management system, the management system stores, into the cross-system application database, information corresponding to the instant message, and the operating system that runs in the foreground may listen on the cross-system application database, and output a prompt of the instant message, so that a user can perceive, in the foreground operating system, the instant message in the background operating system, and user experience is good.

Optionally, the first operating system may be the same as the second operating system, that is, both the first operating system and the second operating system may be systems that run in the foreground.

Alternatively, optionally, the first operating system may be different from the second operating system; the first operating system runs in a background, and the second operating system may run in the foreground.

In some implementations, the second operating system is further configured to: obtain an input instruction of a user, and send a switch request message to the management system according to the input instruction of the user and the first message;

the management system is further configured to: according to the switch request message, switch the second operating system from running in the foreground to running in the background, and switch the first operating system from running in the background to running in the foreground; and send the notification message to the first operating system; and the first operating system is further configured to start the first application according to the notification message.

In some implementations, the first operating system is configured to:

search, according to the notification message, the cross-system application database for the application information corresponding to the first message, and start the first application according to the application information corresponding to the first message.

In some implementations, the management system is further configured to:

obtain a message of an application in each of the multiple operating systems, and determine the cross-system application database according to the message of the application in each operating system.

In some implementations, the cross-system application database includes at least one of an application name, an operating system in which an application is located, an application icon, a message quantity of an application, or an operating system for monitoring a message quantity of an application.

According to a third aspect, a terminal is provided. The terminal includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to execute the method according to any one of the first aspect or the implementations of the first aspect.

According to a fourth aspect, a computer readable storage medium is provided, the computer readable storage medium stores a program, and the program enables a terminal to execute the method for prompting a message in a terminal according to any one of the first aspect or the implementations of the first aspect.

BRIEF DESCRIPTION OF DRAWINGS

FIG. 2 is a schematic flowchart of a method for prompting a message in a terminal according to an embodiment of the present disclosure;

DESCRIPTION OF EMBODIMENTS

The following describes technical solutions in embodiments of the present disclosure with reference to the accompanying drawings.

The technical solutions in the embodiments of the present disclosure may be applied to a terminal. The terminal may be but is not limited to a mobile station (MS), a mobile terminal, a mobile phone, a handset, a portable device, and the like, and my communicate with one or more core networks via a radio access network (RAN). The terminal may be a mobile terminal, such as a mobile phone (or referred to as a "cellular" phone) and a computer with a mobile terminal, for example, may be a portable, pocket-sized, handheld, computer built-in, or in-vehicle mobile terminal, which exchanges language and/or data with the radio access network. Alternatively, the terminal may be various products with a touchscreen, such as a tablet, a touchscreen phone, a touchscreen device, and a mobile phone terminal, and is not limited herein.

The technical solutions in the embodiments of the present disclosure may be applied to mobile terminals that are based on various operating systems. The operating systems include, for example, an Android® operating system (OS), an Apple® iPhone® operating system (iOS®), a Microsoft® (Windows® Phone) operating system, a Symbian® operating system, a BlackBerry® operating system (BlackBerry® OS), and a Microsoft® (Windows Mobile) operating system.

In the embodiments of the present disclosure, the mobile terminal may communicate with one or more core networks via a radio access network (RAN). The mobile terminal may be referred to as an access terminal, user equipment (UE), a subscriber unit, a subscriber station, a mobile station, a mobile, a remote station, a remote terminal, a mobile device, a user terminal, a terminal, a wireless communications device, a user agent, or a user apparatus. The access terminal may be a cellular phone, a cordless telephone set, a Session Initiation Protocol (SIP) phone, a wireless local loop (WLL) station, a personal digital assistant (PDA), a handheld device that has a wireless communications function, a computing device, an in-vehicle device, a wearable device, a terminal device in a future 5G network, or another processing device connected to a wireless modem.

Figure 1:
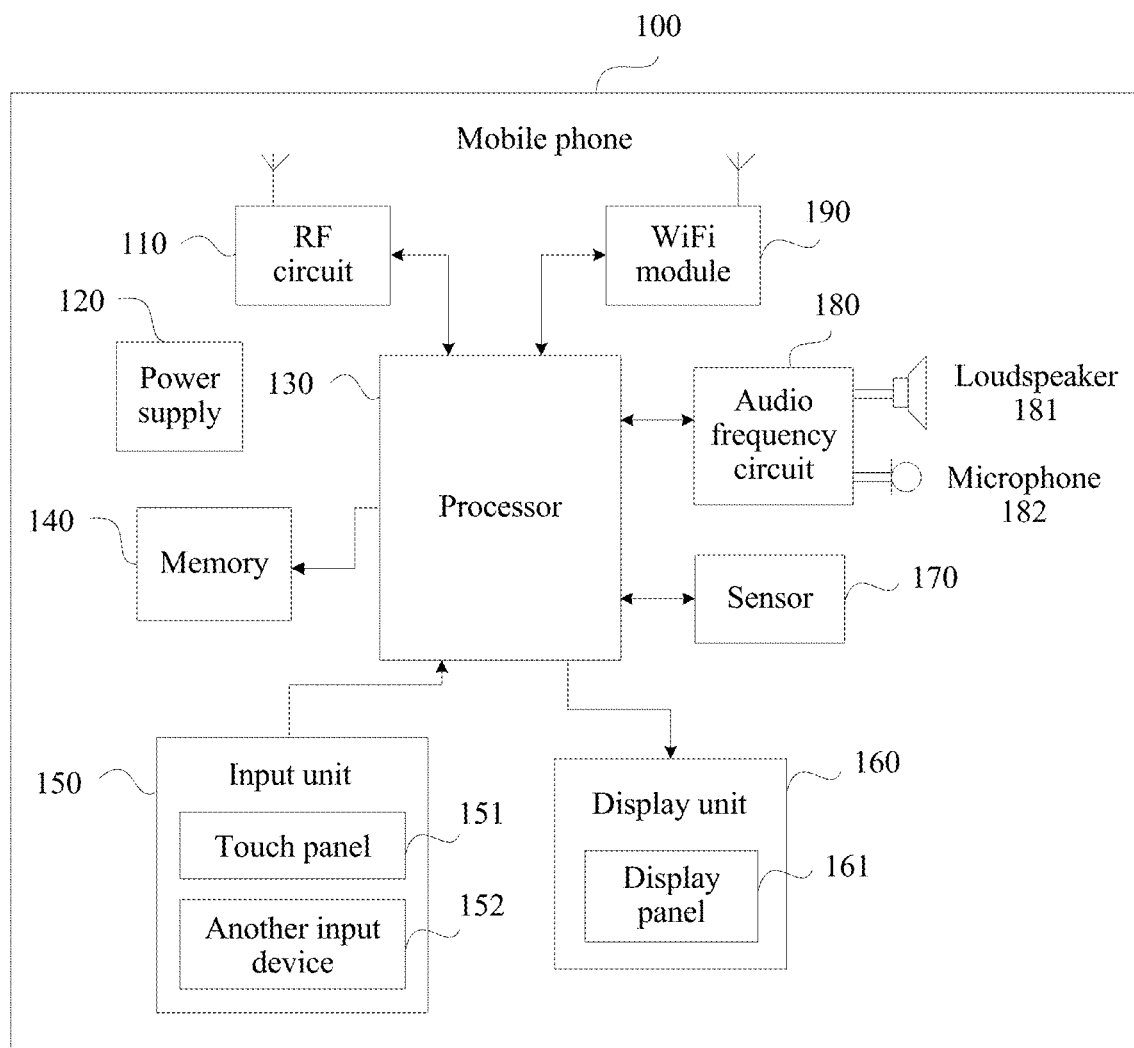
FIG. 1 is a block diagram of a partial structure of a mobile phone related to embodiments of the present disclosure.

The following uses an example in which the terminal is a mobile phone. FIG. 1 is a block diagram of a partial structure of a mobile phone 100 related to the embodiments of the present disclosure. As shown in FIG. 1, the mobile phone 100 may include parts such as a radio frequency (RF) circuit 110, a power supply 120, a processor 130, a memory 140, an input unit 150, a display unit 160, a sensor 170, an audio frequency circuit 180, and a Wireless Fidelity (WiFi) module 190. The structure of the mobile phone shown in FIG. 1 constitutes no limitation on the mobile phone, and the mobile phone may include parts more or fewer than those shown in the figure, or a combination of some parts, or parts arranged in different manners.

The following describes each composition part of the mobile phone 100 in detail with reference to FIG. 1.

The RF circuit 110 may be configured to: receive and send a signal in an information receiving or sending process or a call process, and in particular, after receiving downlink information of a base station, send the downlink information to the processor 130 for processing; and in addition, send designed uplink data to the base station. Generally, the RF circuit includes but is not limited to an antenna, at least one amplifier, a transceiver, a coupler, a low noise amplifier (LNA), a duplexer, and the like. In addition, the RF circuit 110 may communicate with a network and another device by means of wireless communication. The wireless communication may use any communications standard or protocol, which includes but is not limited to a Global System for Mobile Communications (GSM), a general packet radio service (GPRS), Code Division Multiple Access (CDMA), Wideband Code Division Multiple Access (WCDMA), Long Term Evolution (LTE), an email, a short messaging service (SMS), and the like.

The memory 140 may be configured to store a software program and a module. The processor 130 executes various functional applications of the mobile phone 100 and data processing by running the software program and the module stored in the memory 140. The memory 140 may mainly include a program storage area and a data storage area. The program storage area may store an operating system, an application program required by at least one function (such as an audio play function or an image play function), and the like. The data storage area may store data (such as audio data or a phonebook) created according to use of the mobile phone 100, and the like. In addition, the memory 140 may include a high-speed random access memory, or may include a nonvolatile memory, such as at least one magnetic disk storage device, a flash memory device, or another volatile solid-state storage device.

The input unit 150 may be configured to: receive input digit or character information, and generate key-signal input related to user settings and function control of the mobile phone 100. The input unit 150 may include a touch panel 151 and another input device 152. The touch panel 151, which is also referred to as a touchscreen, can collect a touch operation (for example, an operation of a user on the touch panel 151 or near the touch panel 151 by using any proper object or accessory such as a finger or a stylus) of the user on or near the touch panel 151, and drive a corresponding connected apparatus according to a preset program. Optionally, the touch panel 151 may include two parts: a touch detection apparatus and a touch controller. The touch detection apparatus detects a touch location of the user, detects a signal brought by the touch operation, and transmits the signal to the touch controller. The touch controller receives touch information from the touch detection apparatus, converts the touch information into touch point coordinates, and sends the touch point coordinates to the processor 130, and can receive and execute a command sent by the processor 130. In addition, the touch panel 151 may be implemented in multiple types, such as a resistive type, a capacitive type, an infrared ray, and a surface acoustic wave. In addition to the touch panel 151, the input unit 150 may include the another input device 152. The another input device 152 may include but is not limited to one or more of a physical keyboard, a function key (such as a volume control key or an on/off key), a trackball, a mouse, a joystick, or the like.

The display unit 160 may be configured to display information input by the user or information provided for the user and various menus of the mobile phone 100. The display unit 160 may include a display panel 161. Optionally, the display panel 161 may be configured in a form of an liquid crystal display (LCD), an organic light-emitting diode (OLED), or the like. Further, the touch panel 151 may cover the display panel 161. When detecting the touch operation on or near the touch panel 151, the touch panel 151 transmits the touch operation to the processor 130 to determine a type of a touch event, and then the processor 130 provides corresponding visual output on the display panel 161 according to the type of the touch event. Although the touch panel 151 and the display panel 151 in FIG. 1 are used as two independent parts to implement input and input functions of the mobile phone 100, in some embodiments, the touch panel 151 and the display panel 161 may be integrated to implement the input and output functions of the mobile phone 100.

The mobile phone 100 may further include at least one sensor 170, such as a light sensor, a motion sensor, and another sensor. The light sensor may include an ambient light sensor and a proximity sensor. The ambient light sensor may adjust luminance of the display panel 161 according to brightness or dimness of ambient light. The proximity sensor may close the display panel 161 and/or backlight when the mobile phone 100 moves to an ear. As a type of motion sensor, an accelerometer sensor may detect an acceleration value in each direction (generally three axes), may detect a value and a direction of gravity when the mobile phone 100 is static, and may be applied to an application for recognizing a mobile phone posture (for example, a switch between landscape and portrait screens, a relevant game, and magnetometer posture calibration), a function related to vibration recognition (such as a pedometer or a knock), and the like. Other sensors such as a gyroscope, a barometer, a hygrometer, a thermometer, and an infrared sensor may also be disposed on the mobile phone 100, which is not described herein.

The audio frequency circuit 180, a loudspeaker 181, and a microphone 182 may provide audio interfaces between the user and the mobile phone 100. The audio frequency circuit 180 may transmit, to the loudspeaker 181, an electrical signal converted from received audio data, and the loudspeaker 181 converts the electrical signal into a sound signal for output. In another aspect, the microphone 182 converts a collected sound signal into an electrical signal, and the audio frequency circuit 180 receives the electrical signal, converts the electrical signal into audio data, and outputs the audio data to the RF circuit 110 to send the audio data to, for example, another mobile phone, or outputs the audio data to the memory 140 for further processing.

WiFi is a short-distance radio transmission technology. The mobile phone 100 may help, by using the WiFi module 190, the user receive and send an email, browse a web page, access streaming media, and so on. The WiFi module provides the user with wireless broadband Internet access. Although FIG. 1 shows the WiFi module 190, the WiFi module 190 is not a mandatory part of the mobile phone 100, and may be omitted according to a need without changing the essence of the present disclosure.

The processor 130 is a control center of the mobile phone 100, connects all parts of the entire mobile phone by using various interfaces and lines, and executes various functions of the mobile phone 100 and data processing by running or executing the software program and/or the module that are/is stored in the memory 140 and by invoking data stored in the memory 140, so as to implement various services that are based on the mobile phone. Optionally, the processor 130 may include one or more processing units. Preferably, an application processor and a modem processor may be integrated into the processor 130. The application processor mainly processes an operating system, a user interface, an application program, and the like. The modem processor mainly processes wireless communication. The modem processor may not be integrated into the processor 130.

The mobile phone 100 further includes the power supply 120 (such as a battery) that supplies power to the parts. Preferably, the power supply may be logically connected to the processor 130 by using a power supply management system, so that functions such as charging, discharging, and power consumption management are implemented by using the power supply management system.

The mobile phone 100 may further include a camera, a Bluetooth module, and the like, which are not shown though.

In the embodiments of the present disclosure, the terminal may include multiple operating systems (OS). Multiple applications (APP) may be installed or run in each of the multiple operating systems. When the terminal runs the multiple operating systems, only one operating system occupies a foreground, and the other operating systems run in a background. However, when an application in a background system receives an instant message, a foreground system cannot perceive the instant message, and the user needs to actively switch to a corresponding operating system to check whether there is an instant message. Consequently, user experience is poor. The embodiments of the present disclosure attempt to put forward a method for prompting a message in a terminal, so that the user can perceive, in the foreground operating system, the instant message in the background operating system, so as to improve user experience.

FIG. 2 is a schematic flowchart of a method 200 for prompting a message in a terminal according to an embodiment of the present disclosure. The method 200 may be executed by a terminal, for example, the mobile phone 100 in FIG. 1. The terminal includes multiple operating systems and a management system. The management system is configured to manage the multiple operating systems. The management system includes a cross-system application database. The method 200 includes the following operations:

S210. When a first operating system in the multiple operating systems runs in a foreground, and a second operating system in the multiple operating systems runs in a background, if the second operating system receives a first message of a first application in the second operating system, the second operating system sends a notification message to the management system according to the first message, where the notification message carries at least one of operating system information corresponding to the first message, application information corresponding to the first message, or quantity information corresponding to the first message.

S220. The management system stores the notification message into the cross-system application database.

S230. The first operating system listens on the cross-system application database, and outputs a prompt of the first message when listening and obtaining the notification message.

Optionally, in this embodiment of the present disclosure, the management system may be a host OS, which may be a system with management permission, and is configured to manage all operating systems. For example, the management system may control an operating system to switch from running in the foreground to running in the background, or control an operating system to switch from running in the background to running in the foreground. Optionally, for example, the terminal may first start the management system (which may be a virtual system), and then start the multiple operating systems. The management system can check resources and processes of all the operating systems, and may interact or communicate with all the operating systems.

When an operating system (such as the first operating system) in the multiple operating systems runs in the foreground, and an operating system (such as the second operating system) in the multiple operating systems runs in the background, if an application (such as the first application) in the second operating system receives an instant (or real-time) message (such as the first message), the second operating system may send a message (such as the notification message) to the management system according to the first message. Then, the management system may store the notification message into the cross-system application database. In addition, when the first operating system is started, the first operating system listens on the cross-system application database. When listening and obtaining the notification message, the first operating system outputs the prompt or a reminder of the first message. In this way, a user can directly perceive, in a foreground operating system, an instant message in another background operating system without actively switching from the foreground operating system to the background operating system, so that user experience is improved.

In this embodiment of the present disclosure, the notification message may carry at least one of the operating system information corresponding to the first message, the application information corresponding to the first message, or the quantity information corresponding to the first message. In this way, the operating system that runs in the foreground may learn, according to the notification message, of an operating system to which the first message belongs, an application to which the first message belongs, and a quantity of messages, so that the operating system that runs in the foreground displays the prompt of the message in the operating system that runs in the background.

In this embodiment of the present disclosure, the cross-system application database included in the management system may be accessed by the multiple operating systems. For example, a corresponding message manager service module in each operating system has permission to read the cross-system application database. For example, each operating system may include a message manager service module, and the message manager service module may enable a thread to monitor the cross-system application database. In addition, the message manager service module in each operating system may update a quantity of instant messages of a corresponding application according to content in the cross-system application database.

Optionally, the cross-system application database may include at least one of an application name, an operating system in which an application is located, an application icon, a message quantity of an application, or an operating system for monitoring a message quantity of an application.

For example, there may be a global application information database table in the cross-system application database. The database table may include five key information fields, including: 1. an application name (APP Name); 2. a target system (Install OS) in which an application is installed; 3. a list of a system (or briefly referred to as a monitor system Monitor OS) for concerning or monitoring a change in a quantity of instant messages of the application; 4. an application icon (Icon); and 5. an instant-message quantity (Message Number, Msg Num). Optionally, the cross-system application database may further include other fields for subsequent extension. Optionally, the cross-system application database may further include other information related to the application. This is not limited.

In this embodiment of the present disclosure, the notification message may carry at least one of the operating system OS information corresponding to the first message, the application (APP) information corresponding to the first message, or the quantity information corresponding to the first message.

Optionally, in this embodiment of the present disclosure, the "outputting a prompt of the first message" may be outputting or displaying, in the foreground operating system, a quantity of prompts (or reminders) of the first message. For example, there may be an icon (cross-OS APPs) in a status bar in the first operating system. The quantity of prompts of the first message in the second operating system may be displayed on the icon.

In this embodiment of the present disclosure, that "a first operating system runs in a foreground" and that "a second operating system runs in a background" are merely used as examples for description, and constitute no limitation on the present disclosure. For example, optionally, there may be multiple operating systems running in the background. This is not limited.

In this embodiment of the present disclosure, a number "first" or "second" is introduced merely for distinguishing between different objects, for example, distinguishing between "operating systems", and constitutes no limitation on the present disclosure.

Figure 3A:
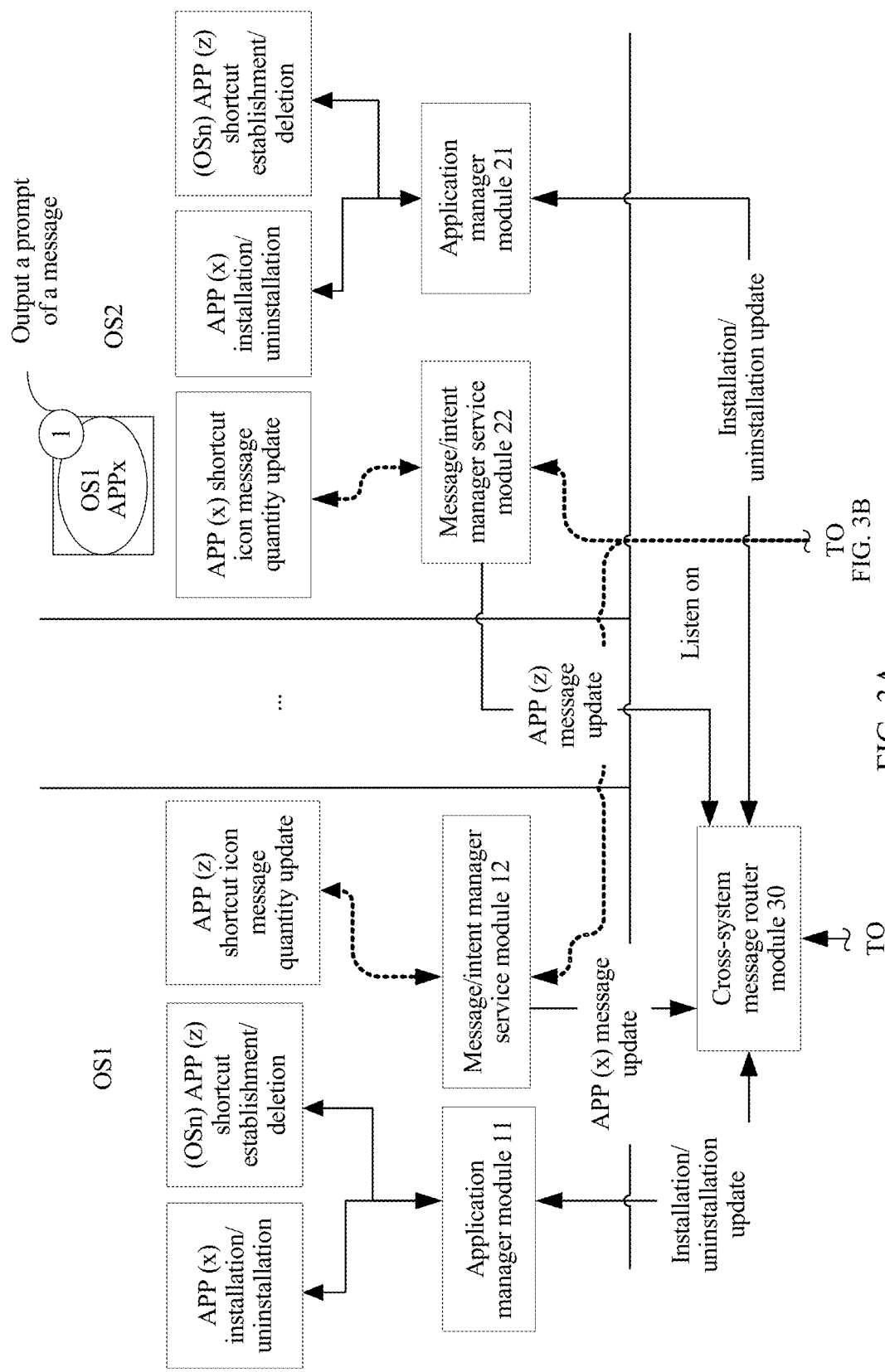
FIG. 3A and FIG. 3B are a schematic diagram of an example according to an embodiment of the present disclosure.
Figure 3B:
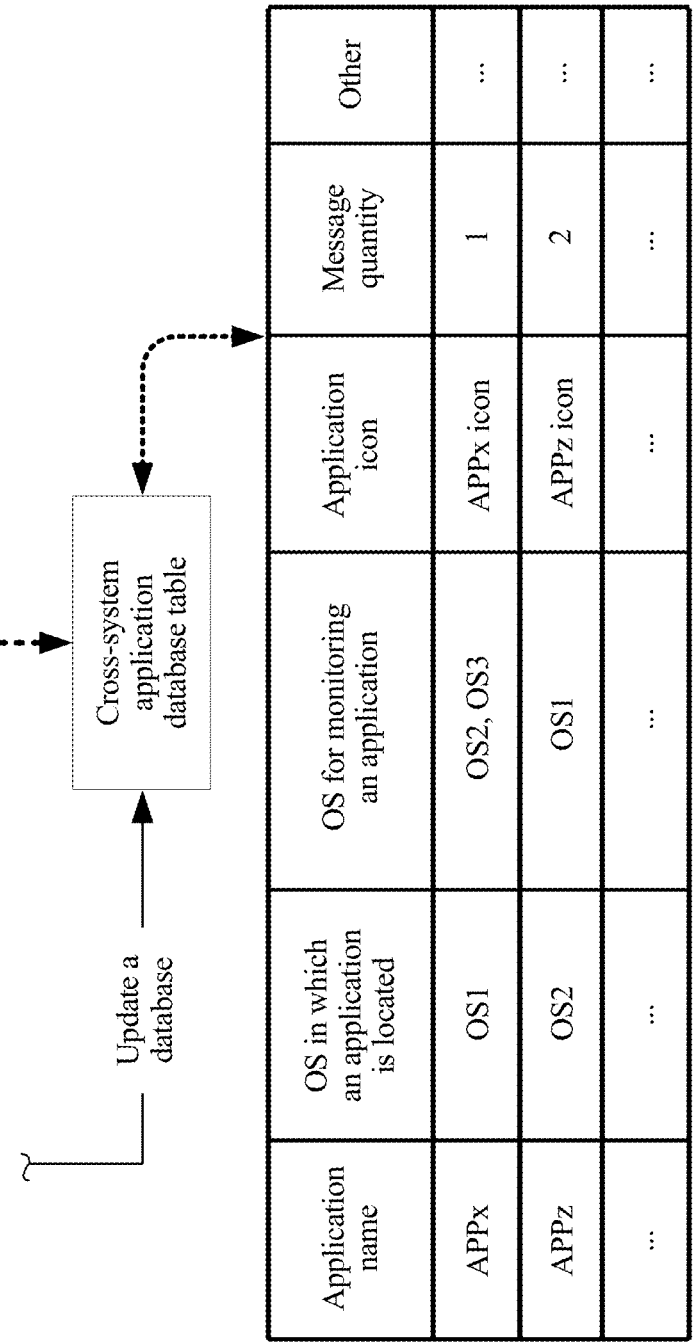

To describe the method for prompting a message in a terminal in this embodiment of the present disclosure, the following provides description with reference to an example in FIG. 3A and FIG. 3B.

As shown in FIG. 3A, a terminal may include an OS1, an OS2, and a cross-system (cross-OS) message router module 30 (which may be a module in a management system). The OS2 runs in a foreground, and the OS1 runs in a background. The OS1 includes an application manager (Message Manager) module 11 and a message/intent manager service module 12. The OS2 includes an application manager module 21 and a message/intent manager service module 22. The application manager module 11 is configured to manage APP (x) installation or uninstallation, where x indicates a number of any APP. The application manager module 11 may further establish, into the OS1, a shortcut of an APP (z) in another OS (n), and may perform an uninstallation operation, where z indicates a number of any APP, and n indicates a number of any OS. If an APPx in the OS1 receives an instant message, the message/intent manager service module 12 may send, to the cross-system message router module 30, information (such as the corresponding APP (x), the corresponding OS, a quantity, and other information) corresponding to the instant message. If the shortcut of the APP (z) is established in the OS1, the message/intent manager service module 12 may also receive an instant message of the APP (z) (as shown in a dashed line in FIG. 3A). Then, the cross-system message router module 30 may update a database according to the received information corresponding to the instant message, i.e., parse the information corresponding to the instant message and then update a cross-system application database table (Cross-OS Applications info Table Database) with information obtained by means of parsing. After being started, the message/intent manager service module 22 in the OS2 enables a monitor thread to listen on the cross-system application database table. In this case, if the message/intent manager service module 22 listens and obtains the information corresponding to the instant message, the message/intent manager service module 22 may output a prompt of the instant message, for example, output, in an interface of the OS2, a prompt that a quantity of messages of the APPx in the OS1 is 1.

In FIG. 3B, the cross-system application database table may include an application name (such as the APPx or the APPz), an OS (such as the OS1 or the OS2) in which an application is located, an OS for monitoring or listening on an application (for example, the OS2 and an OS3 may monitor the APPx, and the OS1 may monitor the APPz), an application icon (such as an icon of the APPx or an icon of the APPz), a quantity of messages (such as 1 or 2), and other information.

An intent manager service (Intent) manager service module is configured to resolve communication between components of an application in an OS.

The corresponding application manager module 21 and the message/intent manager service module 22 in the OS2 have similar roles or functions as the corresponding application manager module 11 and the message/intent manager service module 12 in the OS1. For brevity, details are not described.

In FIG. 3A and FIG. 3B, the OS1 and the OS2 are merely used as an example for description. In practice, there may be more OSs. This is not limited.

The example in FIG. 3A and FIG. 3B is introduced merely for a person skilled in the art to understand the technical solutions of the present disclosure, and constitutes no limitation on the present disclosure.

Optionally, in an embodiment, the method 200 may further include:

obtaining, by the first operating system, an input instruction of a user, and sending a switch request message to the management system according to the input instruction of the user and the first message;

switching, by the management system according to the switch request message, the first operating system from running in the foreground to running in the background, and switching the second operating system from running in the background to running in the foreground; and sending the notification message to the second operating system; and starting, by the second operating system, the first application according to the notification message.

Optionally, after discovering the prompt of the first message, the user may tap a shortcut of the first application corresponding to the first message. From a perspective of the first operating system that runs in the foreground of the terminal, the first operating system may obtain the input instruction of the user (which may be a tap event of the user, for example, the user taps an application shortcut icon).

The first operating system that runs in the foreground of the terminal may obtain the input instruction of the user, and then send the switch request message to the management system according to the received first message and the input instruction of the user. After receiving the switch request message, the management system may switch the first operating system from running in the foreground to running in the background, and switch the second operating system from running in the background to running in the foreground; and send the notification message to the second operating system, so that the second operating system may obtain, by means of parsing according to the notification message, an application corresponding to the first message. Finally, the second operating system may start the first application according to the notification message. In this way, the terminal may directly switch to a corresponding operating system according to the shortcut of the first application, so as to greatly facilitate an operation of the user.

Optionally, the second operating system may search, according to the notification message, the cross-system application database for the application information corresponding to the first message, and start the first application according to the application information corresponding to the first message.

For example, the second operating system may find, according to the notification message, that the application corresponding to the first message is the first application, and then directly display a home page of the first application.

Figure 4:
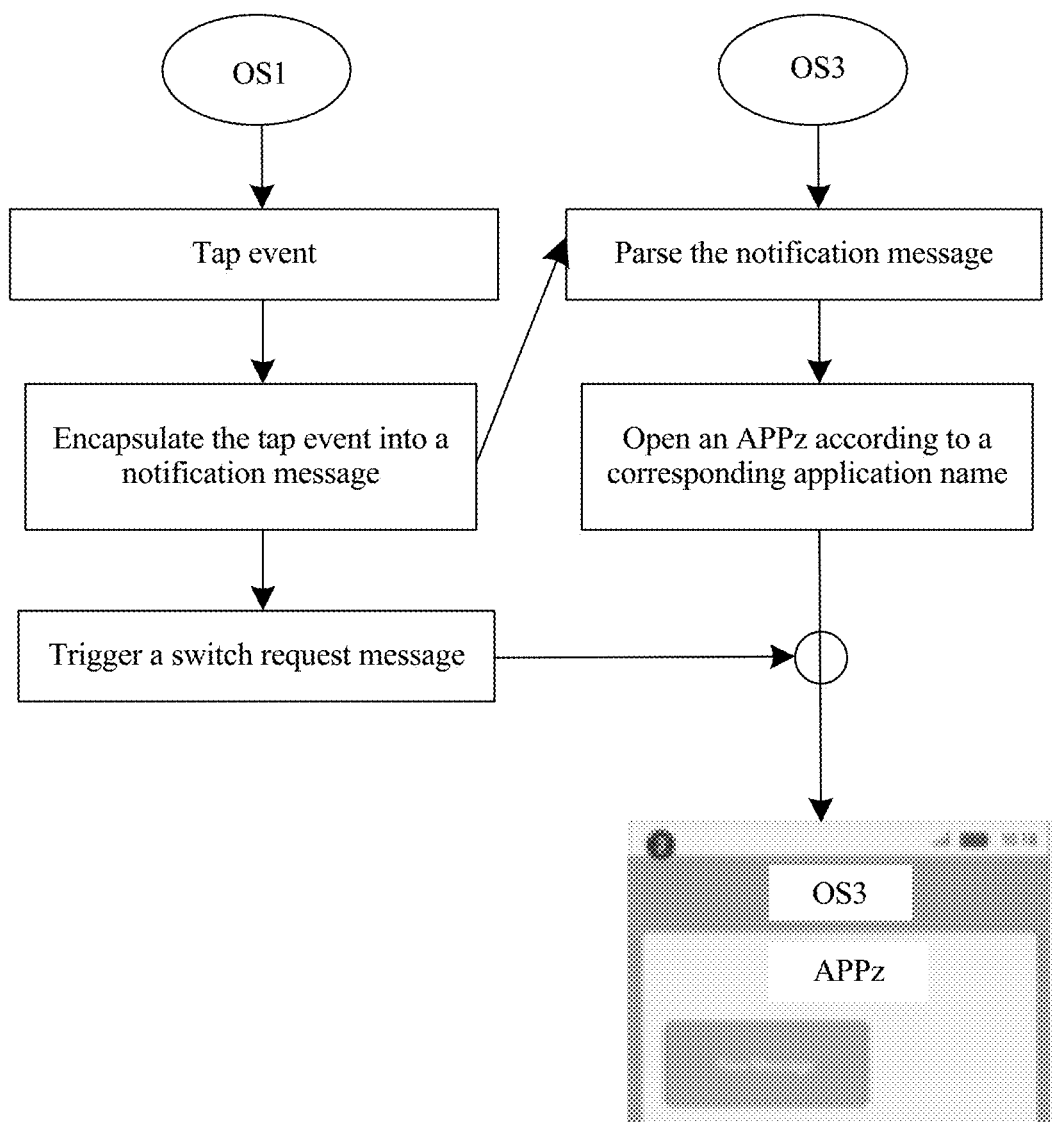
FIG. 4 is a schematic diagram of another example according to an embodiment of the present disclosure.

The following describes this embodiment of the present disclosure with reference to an example in FIG. 4. As shown in FIG. 4, for example, an OS1 is a foreground system, and an OS3 is a background system. The OS1 obtains a tap event of a user (for example, tapping an APPz in the OS3), and then encapsulates the tap event into a notification message (which includes an OS corresponding to the tap event, an APP corresponding to the tap event, and a quantity). The OS1 sends the notification message to the corresponding OS3, and triggers a switch request message. A management system (not shown in the figure) of a terminal may switch a current foreground system from the OS1 to the OS3. The OS3 may parse the notification message to obtain a corresponding application name, that is APPz, and finally, directly open the APPz to display a home page of the APPz. Optionally, if a lock screen function is set in the OS3, the user needs to first perform unlocking.

Optionally, manners of creating and deleting a cross-system application shortcut icon are further provided in this embodiment of the present disclosure.

Optionally, the manner of creating a cross-system application shortcut icon may include: (1) The cross-system application shortcut icon is created in an application installation process. (2) An application icon is dragged into a "cross-OS area" icon, where the "cross-OS area" icon is a cross-system application aggregation box added in this embodiment of the present disclosure.

Figure 5:
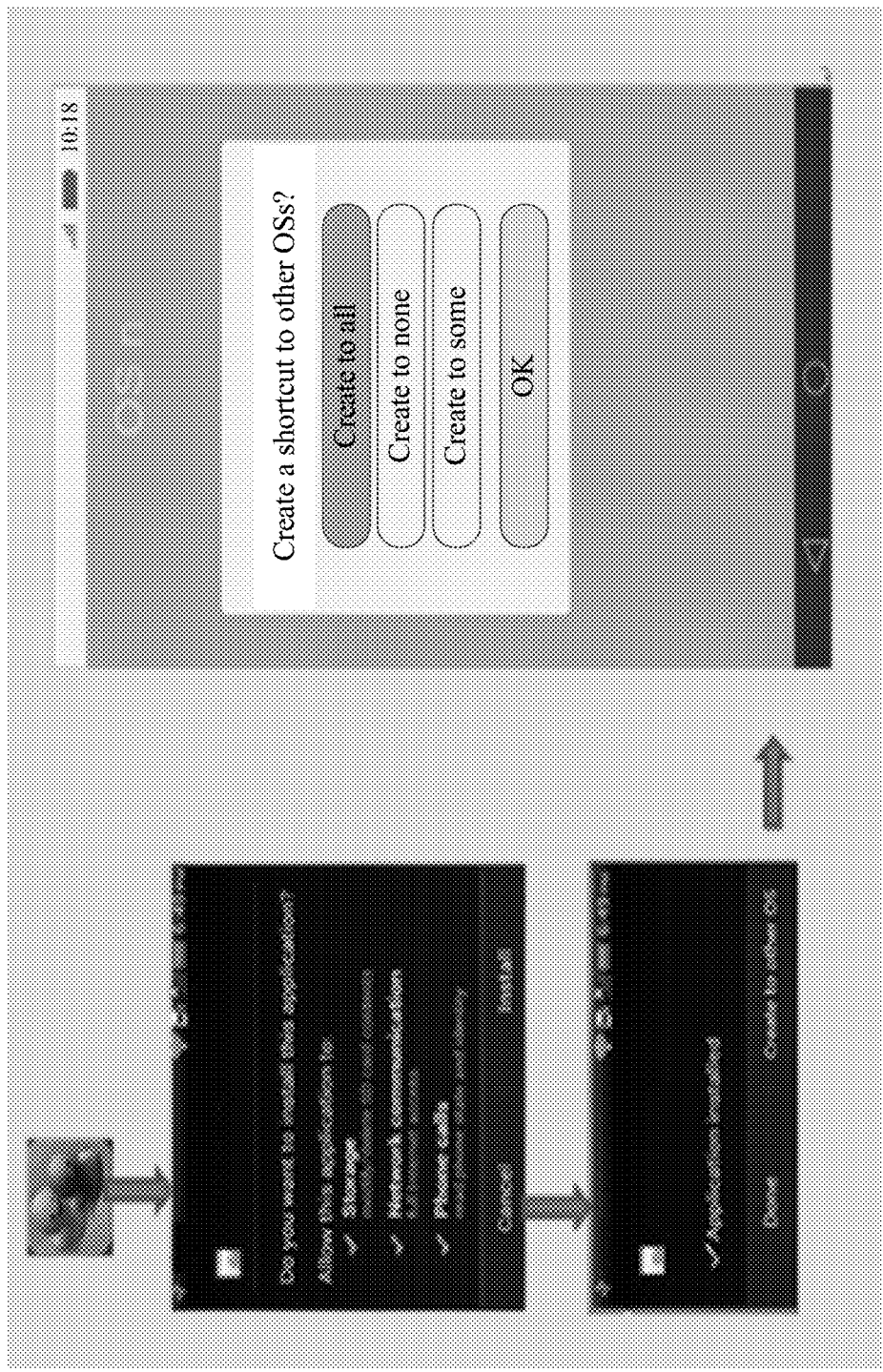
FIG. 5 is an interface diagram of an example of creating a cross-system application shortcut icon according to an embodiment of the present disclosure.

In the manner (1), for example, FIG. 5 shows an interface diagram of an example of creating a cross-system application shortcut icon according to an embodiment of the present disclosure. As shown in FIG. 5, in a process of installing an application of an OS n (n indicates a system number), after the application is installed, in this embodiment of the present disclosure, a "create a shortcut to other systems/Create to other OSs" option is added in an interface of the terminal. After the user taps the option, an interface may pop up to let the user select a target system to which an application shortcut needs to be created.

Figure 6A:
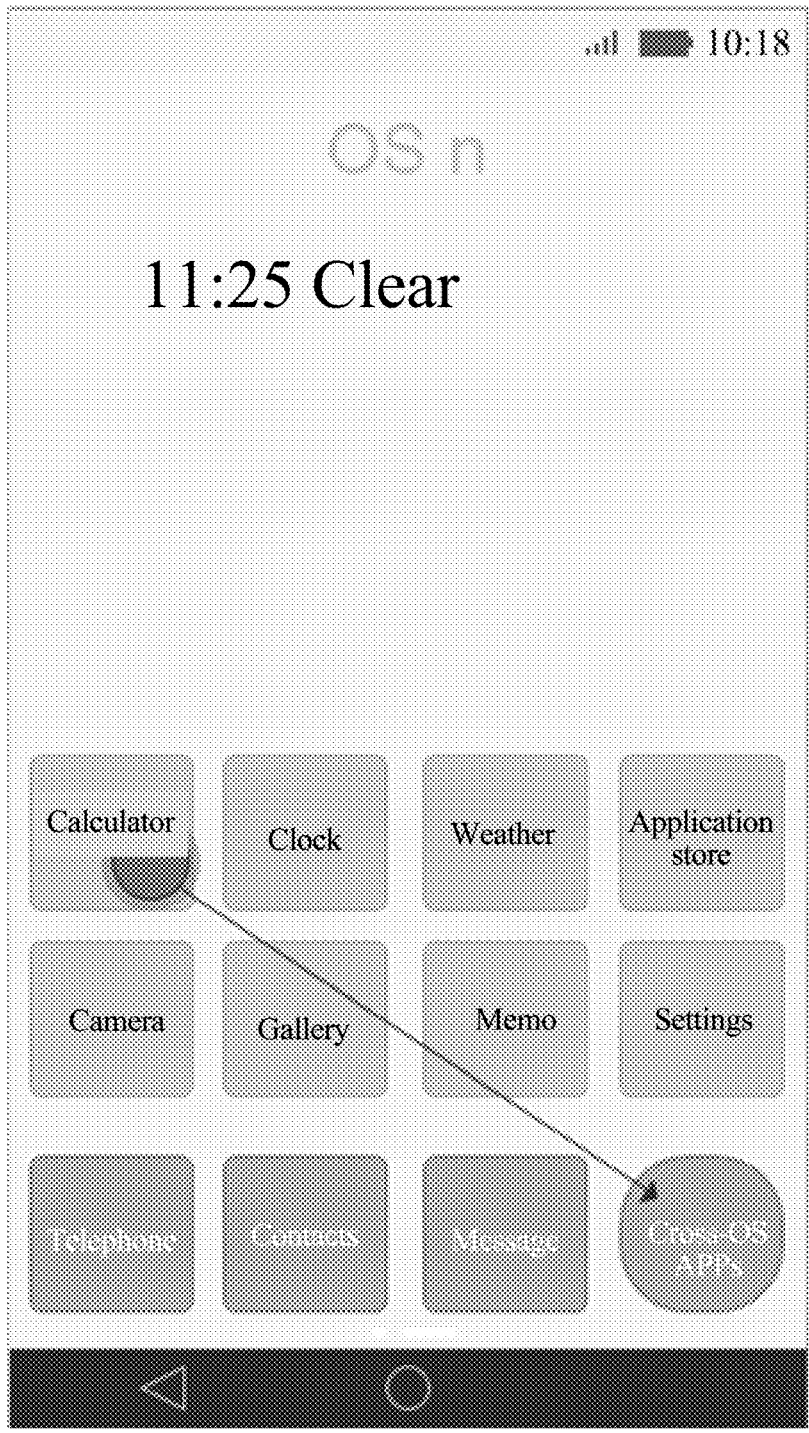
FIG. 6A and FIG. 6B are an interface diagram of another example of creating a cross-system application shortcut icon according to an embodiment of the present disclosure.
Figure 6B:
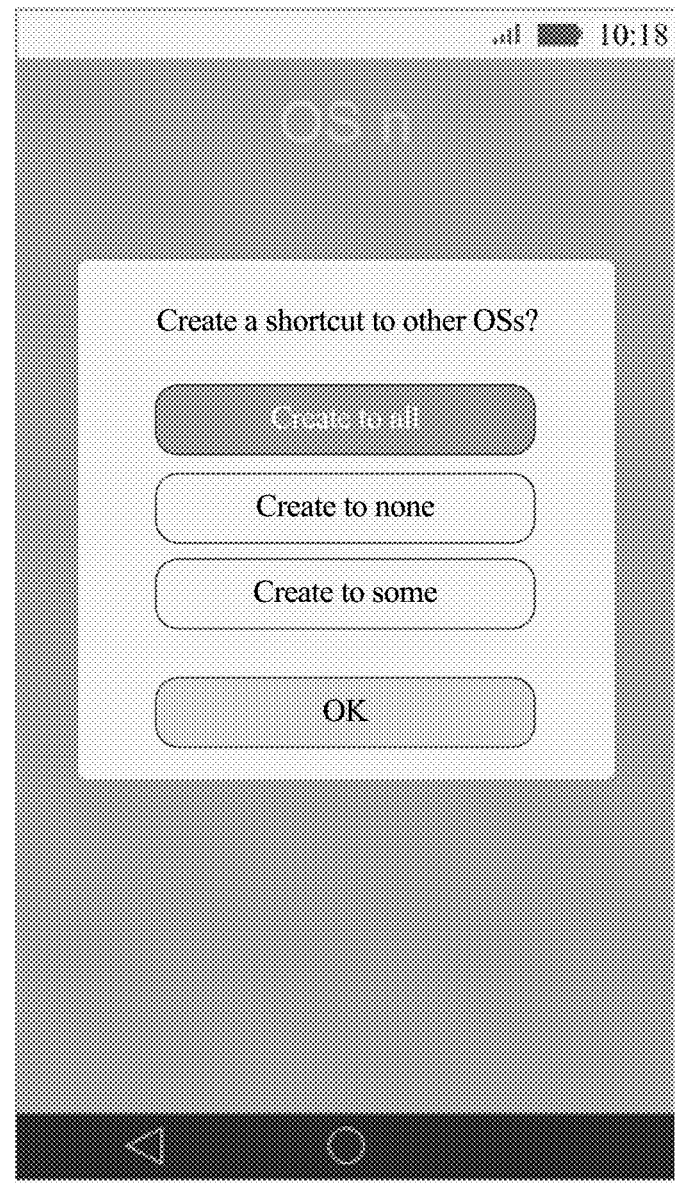

In the manner (2), for example, FIG. 6A and FIG. 6B show interface diagrams of another example of creating a cross-system application shortcut icon according to an embodiment of the present disclosure. As shown in FIG. 6A and FIG. 6B, when an OS n runs in a foreground, if a shortcut of an application "calculator" needs to be added to other OSs, the user may touch and hold an application icon of the "calculator", and then drag the icon into a "cross-OS APPs" area in FIG. 6A. In this case, a selection page for creating a shortcut pops up in the system OS n. Then, selection is performed according to an intention of the user, and then, confirmation is performed. Optionally, if the user decides to create the "calculator" in the OS1 or an OS2, the user may select a "create to some" option. In this case, an OS (that is, the OS1 or the OS2) associated with the "calculator" is added to a monitor (Monitor) OS field in a cross-system database table in the management system, as shown in Table 1.

Table 1

| | | Cross-system database table | | | |
|---|---|---|---|---|---|
| APP Name | Install OS | Monitor OS | Icon | Msg | Other |
| Calculator | OS n | OS1, OS2 | Calculator icon | 0 | ... |

In Table 1, the "OS1, OS2" is added to the monitor OS corresponding to the "calculator" in the cross-system database table.

The interface diagrams in FIG. 5 and FIG. 6A and FIG. 6B are merely used as examples for describing the manner of creating a cross-system application shortcut icon in this embodiment of the present disclosure, and constitute no limitation on the present disclosure.

Optionally, there are two manners of deleting an application shortcut icon: (1) An application is deleted in a system in which the application is located, so as to automatically delete or cancel a reminding function for the application in the cross-system application shortcut icon. (2) A message reminding function of a current system for the application is directly canceled in the cross-system application shortcut icon.

In this way, the user may dynamically add or delete the cross-system application shortcut icon, so that the user dynamically adjusts a current shortcut list according to a use scenario, and operations are more convenient and flexible.

Figure 7A:
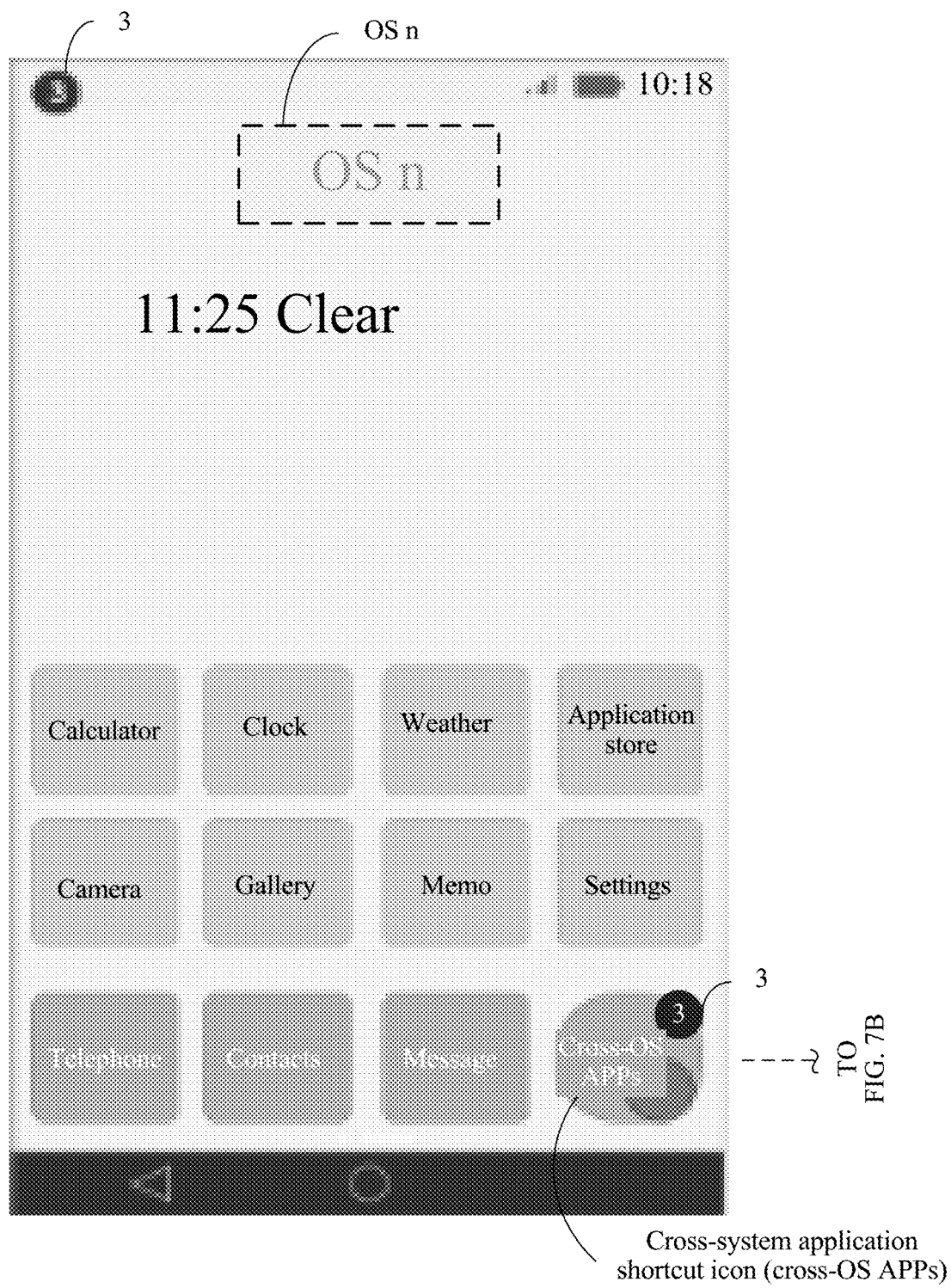
FIG. 7A, FIG. 7B, and FIG. 7C are a schematic diagram of still another example according to an embodiment of the present disclosure.
Figure 7B:
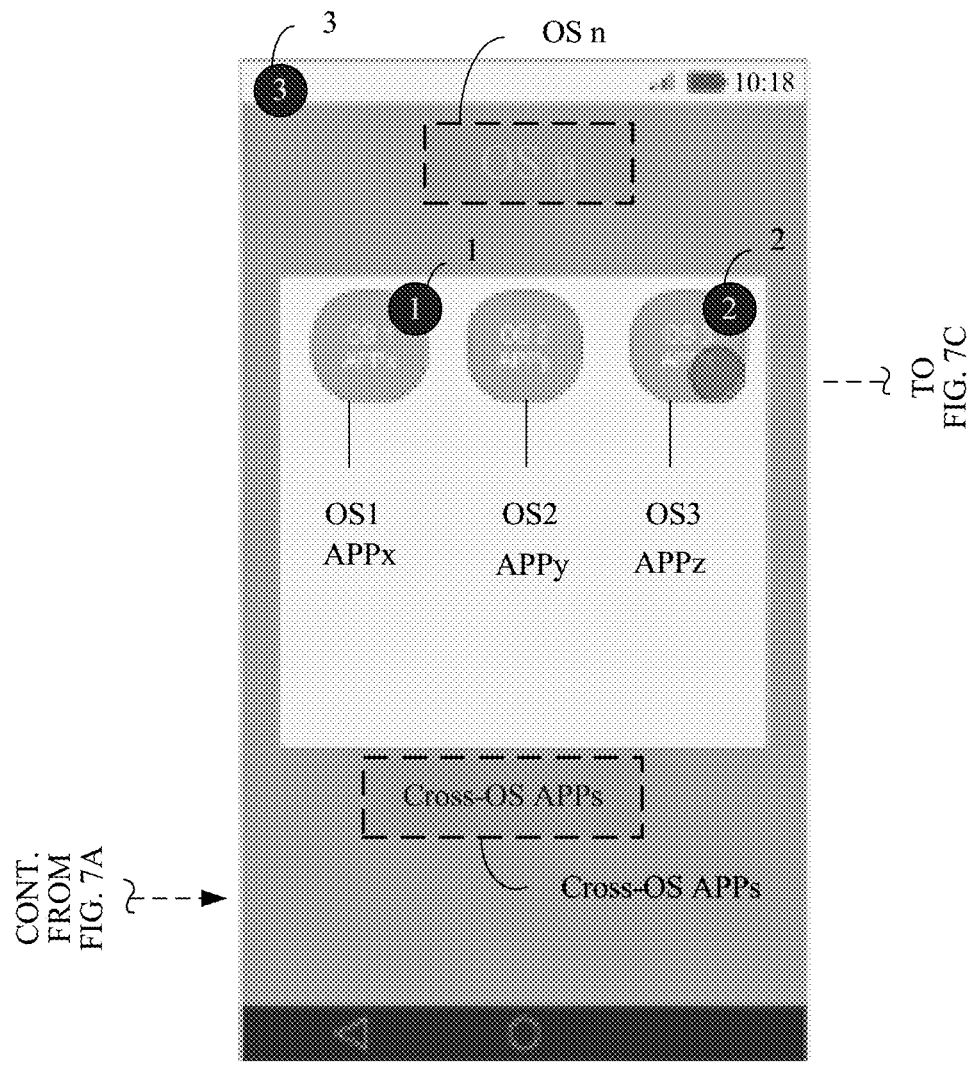
Figure 7C:
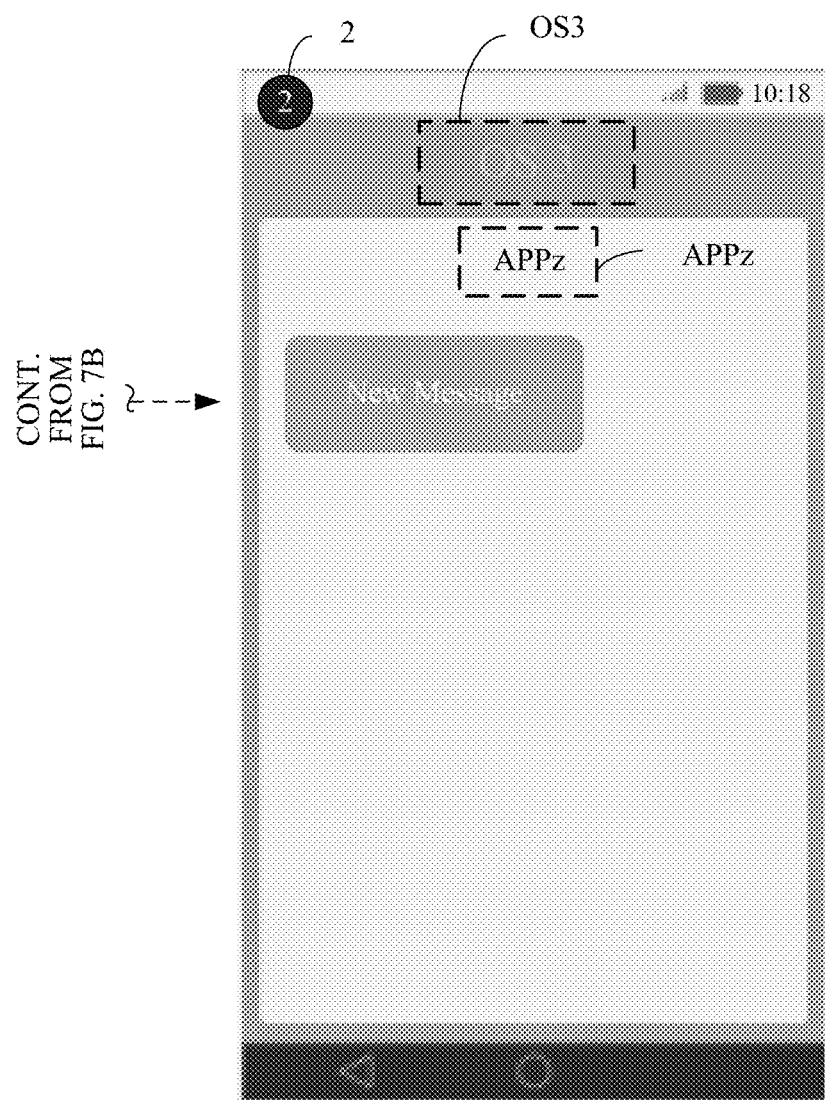

FIG. 7A, FIG. 7B, and FIG. 7C are a schematic diagram of still another example according to an embodiment of the present disclosure. As shown in FIG. 7A, FIG. 7B, and FIG. 7C, a system that runs in a foreground of a terminal is an OS n, and systems that run in a background include an OS1 and an OS3. An APPx in the OS1 receives one message, and an APPz in the OS3 receives two messages. After the technical solution in this embodiment of the present disclosure is used, the messages may be directly perceived. It can be seen from a leftmost diagram in FIG. 7 that three message prompts are displayed in a cross-system application shortcut icon box (that is, "cross-OS APPS" in the leftmost diagram in FIG. 7). In this case, a user taps the "cross-OS APPs", and may learn of OSs corresponding to the three messages and applications corresponding to the three messages (as shown in a middle diagram in FIG. 7, there is one message prompt in the APPx in the OS1, and there are two message prompts in the APPz in the OS3). Further, if the user needs to check the message prompt in the OS3, the user may directly tap an "OS3 APPz", to directly switch from the OS n to the OS3 (that is, switch to a page in a rightmost diagram in FIG. 7) and automatically open the APPz to check the message. Optionally, if a lock screen password is set in the OS3, the user needs to enter the lock screen password.

The interface diagrams in FIG. 7A, FIG. 7B, and FIG. 7C are merely used as an example for describing this embodiment of the present disclosure, and constitutes no limitation on the present disclosure.

Therefore, according to the method for prompting a message in a terminal in this embodiment of the present disclosure, when the first operating system in the multiple operating systems runs in the foreground, and the second operating system in the multiple operating systems runs in the background, if the second operating system receives the first message of the first application in the second operating system, the second operating system sends the notification message to the management system according to the first message, the management system stores the notification message into the cross-system application database, and the first operating system listens on the cross-system application database, and outputs the prompt of the first message when listening and obtaining the notification message, so that the user can perceive, in the foreground operating system, the instant message in the background operating system, and user experience is good.

The foregoing describes the method for prompting a message in a terminal according to the embodiment of the present disclosure. The following describes a terminal according to an embodiment of the present disclosure. Herein, for brevity, some similar concepts or terms are not described again.

Figure 8:
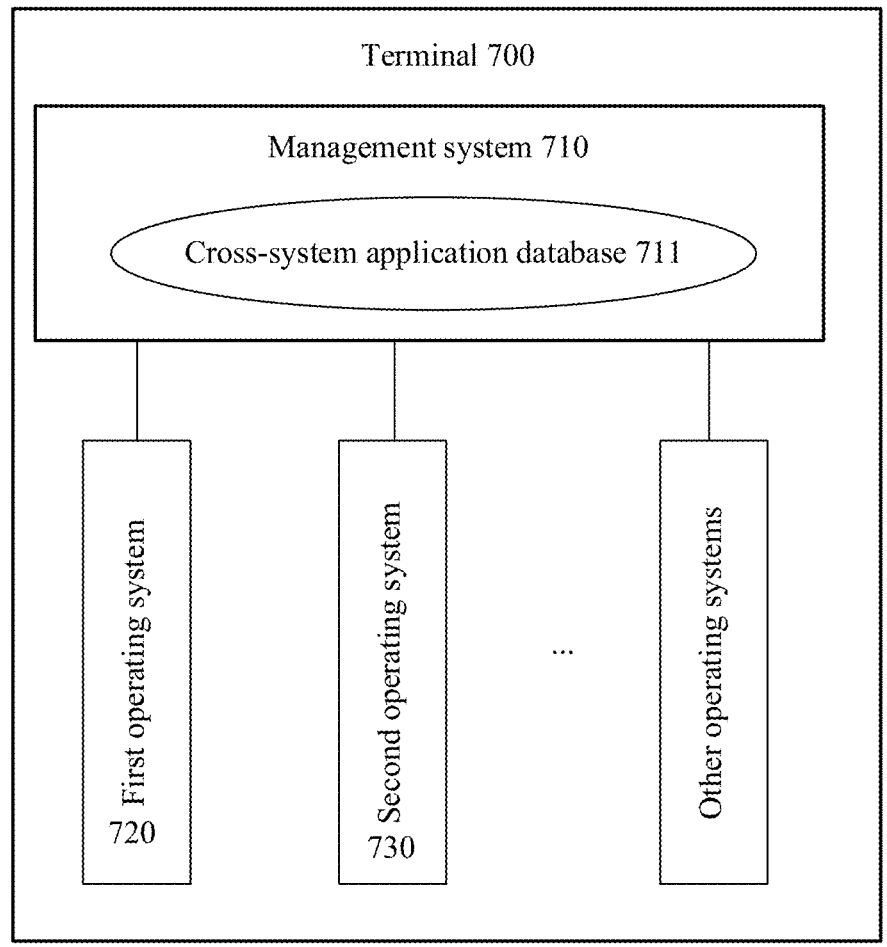
FIG. 8 is a schematic block diagram of a terminal according to an embodiment of the present disclosure.

FIG. 8 is a schematic block diagram of a terminal 700 according to an embodiment of the present disclosure. Optionally, the terminal 700 may be the mobile phone 100 shown in FIG. 1 in the foregoing. The terminal 700 may include multiple operating systems and a management system 710. The management system 710 includes a cross-system application database 711.

A first operating system 720 in the multiple operating systems is configured to: receive a first message of a first application in the first operating system 720, and send a notification message to the management system 710 according to the first message. The notification message includes the first message, and the notification message carries at least one of operating system information corresponding to the first message, application information corresponding to the first message, or quantity information corresponding to the first message.

The management system 710 is configured to store the notification message into the cross-system application database 711.

A second operating system 730 in the multiple operating systems is configured to: listen on the cross-system application database 711, and output a prompt of the first message when listening and obtaining the notification message. The second operating system 730 runs in a foreground.

Optionally, the first operating system 720 may be the same as the second operating system 730, that is, both the first operating system 720 and the second operating system 730 may be systems that run in the foreground.

Alternatively, optionally, the first operating system 720 may be different from the second operating system 730, i.e., the first operating system 720 runs in a background, and the second operating system 730 may run in the foreground.

Optionally, the terminal 700 may include the multiple operating systems (for example, the first operating system 720, the second operating system 730, . . . , and other operating systems in FIG. 8).

Optionally, in an embodiment, the second operating system 730 is further configured to: obtain an input instruction of a user, and send a switch request message to the management system 710 according to the input instruction of the user and the first message.

The management system 710 is further configured to: according to the switch request message, switch the second operating system 730 from running in the foreground to running in the background, and switch the first operating system 720 from running in the background to running in the foreground; and send the notification message to the first operating system 720.

The first operating system 720 is further configured to start the first application according to the notification message.

Optionally, in an embodiment, the first operating system 720 is configured to:

search, according to the notification message, the cross-system application database 711 for the application information corresponding to the first message, and start the first application according to the application information corresponding to the first message.

Optionally, in an embodiment, the management system 710 is further configured to:

obtain a message of an application in each of the multiple operating systems, and determine the cross-system application database 711 according to the message of the application in each operating system.

Optionally, in an embodiment, the cross-system application database 711 may include at least one of an application name, an operating system in which an application is located, an application icon, a message quantity of an application, or an operating system for monitoring a message quantity of an application.

The terminal 700 according to this embodiment of the present disclosure may execute the method 200 for prompting a message in a terminal in the embodiment of the present disclosure. In addition, the foregoing and other operations and/or functions of the modules in the terminal 700 are respectively used to implement corresponding procedures of the method. For brevity, details are not described herein again.

Therefore, according to the terminal 700 in this embodiment of the present disclosure, the operating system that runs in the background may send a received instant message to the management system, the management system stores, into the cross-system application database, information corresponding to the instant message, and the operating system that runs in the foreground may listen on the cross-system application database, and output a prompt of the instant message, so that the user can perceive, in the foreground operating system, the instant message in the background operating system, and user experience is good.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present disclosure.

It is by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the embodiments of the present disclosure, the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in the embodiments of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of the present disclosure. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for prompting a message in a terminal, comprising:

receiving, by a second operating system of the terminal, a first message of a first application in the second operating system when a first operating system of the terminal runs in a foreground, and the second operating system runs in a background, wherein the first operating system and the second operating system are managed by a management system of the terminal, wherein the management system comprises a cross-system application database;

sending, by the second operating system, a notification message to the management system according to the first message, wherein the notification message carries at least one of operating system information corresponding to the first message, application information corresponding to the first message, or quantity information corresponding to the first message;

storing, by the management system, the notification message into the cross-system application database, wherein the cross-system application database is to be monitored by a thread in each of the first operating system and the second operating system; and listening, by the first operating system, on the cross-system application database, and outputting a prompt of the first message when the notification message is detected.

2. The method according to claim 1, wherein the method further comprises:
obtaining, by the first operating system, an input instruction of a user;
sending, by the first operating system, a switch request message to the management system according to the first message and the input instruction of the user;
switching, by the management system according to the switch request message, the first operating system from running in the foreground to running in the background, and the second operating system from running in the background to running in the foreground; and sending the notification message to the second operating system; and
starting, by the second operating system, the first application according to the notification message.

3. The method according to claim 2, wherein the starting, by the second operating system, the first application according to the notification message comprises:
searching, by the second operating system according to the notification message, the cross-system application database for the application information corresponding to the first message, and starting the first application according to the application information corresponding to the first message.

4. The method according to claim 1, wherein the method further comprises:
obtaining, by the management system, a message of an application in each of the first operating system and the second operating system; and
determining the cross-system application database according to the message of the application in each operating system.

5. The method according to claim 1, wherein the cross-system application database comprises, for each application, at least one of a name of the application, an operating system in which the application is located, an icon of the application, a message quantity of the application, or an operating system for monitoring the message quantity of the application.

6. A terminal, comprising:
a memory storing instructions;
at least one hardware processor to execute the instructions;
a first operating system and a second operating system;
a management system configured to manage the first operating system and the second operating system, and comprising a cross-system application database;
wherein the first operating system is configured to:
receive a first message of a first application in the first operating system, and
send a notification message to the management system according to the first message,
wherein the notification message comprises the first message, and carries at least one of operating system information corresponding to the first message, application information corresponding to the first message, or quantity information corresponding to the first message;

wherein the management system is configured to store the notification message into the cross-system application database, which is to be monitored by a thread in each of the first operating system and the second operating system; and
wherein the second operating system is configured to:
listen on the cross-system application database, and
output a prompt of the first message when the notification message is detected, wherein the second operating system runs in a foreground.

7. The terminal according to claim 6, wherein the second operating system obtains an input instruction of a user, and sends a switch request message to the management system according to the input instruction of the user and the first message;
wherein the management system is further configured to:
switch, according to the switch request message, the second operating system from running in the foreground to running in a background, and the first operating system from running in the background to running in the foreground; and
send the notification message to the first operating system; and
wherein the first operating system is further configured to start the first application according to the notification message.

8. The terminal according to claim 7, wherein the first operating system is further configured to:
search, according to the notification message, the cross-system application database for the application information corresponding to the first message; and
start the first application according to the application information corresponding to the first message.

9. The terminal according to claim 6, wherein the management system is further configured to:
obtain a message of an application in each of the first operating system and the second operating system; and
determine the cross-system application database according to the message of the application in each operating system.

10. The terminal according to claim 6, wherein the cross-system application database comprises, for each application, at least one of a name of the application, an operating system in which the application is located, an icon of the application, a message quantity of the application, or an operating system for monitoring the message quantity of the application.

11. A non-transitory machine-readable medium having instructions stored therein for prompting a message, the instructions, when executed by a processor of a terminal, causing the terminal to perform operations comprising:
receiving a first message of a first application in a second operating system when a first operating system of the terminal runs in a foreground, and the second operating system runs in a background, wherein the first operating system and the second operating system are managed by a management system of the terminal, wherein the management system comprises a cross-system application database;
sending a notification message to the management system according to the first message, wherein the notification message carries at least one of operating system information corresponding to the first message, application information corresponding to the first message, or quantity information corresponding to the first message;

storing the notification message into the cross-system application database, wherein the cross-system application database is to be monitored by a thread in each of the first operating system and the second operating system; and listening on the cross-system application database, and outputting a prompt of the first message when the notification message is detected.

12. The non-transitory machine-readable medium according to claim 11, wherein the operations further comprise:

obtaining an input instruction of a user;

sending a switch request message to the management system according to the first message and the input instruction of the user;

switching, according to the switch request message, the first operating system from running in the foreground to running in the background, and the second operating system from running in the background to running in the foreground; and sending the notification message to the second operating system; and starting the first application according to the notification message.

13. The non-transitory machine-readable medium according to claim 12, wherein the starting, by the second operating system, the first application according to the notification message comprises:

searching, according to the notification message, the cross-system application database for the application information corresponding to the first message, and starting the first application according to the application information corresponding to the first message.

14. The non-transitory machine-readable medium according to claim 11, wherein the operations further comprise:

obtaining a message of an application in each of the first operating system and the second operating system; and determining the cross-system application database according to the message of the application in each operating system.

15. The non-transitory machine-readable medium according to claim 11, wherein the cross-system application database comprises, for each application, at least one of a name of the application, an operating system in which the application is located, an icon of the application, a message quantity of the application, or an operating system for monitoring the message quantity of the application.

* * * * *